(12) United States Patent
Beers et al.

(10) Patent No.: US 12,014,250 B2
(45) Date of Patent: Jun. 18, 2024

(54) MACHINE LEARNING-BASED PATENT QUALITY METRIC

(71) Applicant: OCEAN TOMO, LLC, Chicago, IL (US)

(72) Inventors: Matthew Beers, Ashland, OR (US); Elvir Causevic, San Francisco, CA (US)

(73) Assignee: OCEAN TOMO, LLC, Chicago, IL (US)

( * ) Notice: Subject to any disclaimer, the term of this patent is extended or adjusted under 35 U.S.C. 154(b) by 601 days.

(21) Appl. No.: 16/939,935

(22) Filed: Jul. 27, 2020

(65) Prior Publication Data
US 2020/0356902 A1  Nov. 12, 2020

Related U.S. Application Data

(63) Continuation of application No. 15/837,652, filed on Dec. 11, 2017, now Pat. No. 10,846,620, which is a
(Continued)

(51) Int. Cl.
| | | |
|---|---|---|
| *G06N 20/00* | (2019.01) | |
| *G06F 18/20* | (2023.01) | |
| *G06F 18/21* | (2023.01) | |
| *G06F 18/24* | (2023.01) | |
| *G06F 18/2415* | (2023.01) | |

(Continued)

(52) U.S. Cl.
CPC ........... *G06N 20/00* (2019.01); *G06F 18/217* (2023.01); *G06F 18/2415* (2023.01); *G06F 18/24765* (2023.01); *G06F 18/285* (2023.01); *G06N 5/043* (2013.01); *G06N 3/045* (2023.01); *G06N 3/086* (2013.01)

(58) Field of Classification Search
None
See application file for complete search history.

(56) References Cited

U.S. PATENT DOCUMENTS

| | | |
|---|---|---|
| 5,361,201 A | 11/1994 | Jost et al. |
| 6,556,992 B1 | 4/2003 | Barney et al. |

(Continued)

OTHER PUBLICATIONS

"Decision Option Predictive Analytics—Example analytics on patent data," Decision Options®, LLC. 2013.
(Continued)

*Primary Examiner* — Alan Chen
(74) *Attorney, Agent, or Firm* — Amster, Rothstein & Ebenstein LLP

(57) ABSTRACT

A machine-learning based artificial intelligence device for finding an estimate of patent quality, such as patent lifetime or term is disclosed. Such a device may receive a first set of patent data and generate a list of binary classifiers. A candidate set of binary classifiers may be selected and using a heuristic search, for example an artificial neural network (ANN), a genetic algorithm, a final set of binary classifiers is found by maximizing iteratively a yield according to a cost function, such an area under a curve (AUC) of a receiver operating characteristic (ROC). The device may then receive patent information for a target patent and report an estimate of patent quality according to the final set of binary classifiers.

8 Claims, 9 Drawing Sheets

Related U.S. Application Data continuation of application No. 14/598,879, filed on Jan. 16, 2015, now abandoned.

(60) Provisional application No. 61/928,806, filed on Jan. 17, 2014.

(51) Int. Cl.
*G06N 5/043* (2023.01)
*G06N 3/045* (2023.01)
*G06N 3/086* (2023.01)

(56) References Cited

U.S. PATENT DOCUMENTS

| | | |
|---|---|---|
| 7,657,476 B2 | 2/2010 | Barney |
| 7,716,226 B2 | 5/2010 | Barney |
| 7,949,581 B2 | 5/2011 | Barney |
| 7,962,511 B2 | 6/2011 | Barney |
| 8,131,701 B2 | 3/2012 | Barney |
| 8,504,560 B2 | 8/2013 | Barney |
| 8,818,996 B2 | 8/2014 | Barney |
| 2011/0093449 A1* | 4/2011 | Belenzon ............... G06N 7/01 707/E17.108 |
| 2012/0278244 A1* | 11/2012 | Lee ...................... G06Q 50/184 705/310 |
| 2013/0282599 A1* | 10/2013 | Kang ................... G06Q 50/184 705/310 |
| 2013/0282735 A1* | 10/2013 | Pedersen ............. G06F 16/3323 707/748 |

OTHER PUBLICATIONS

"Decision Option Predictive Analytics—Example analytics on patent data II," Decision Options®, LLC. 2013.

"Value Based Strategy Selection and Design for Combination Drugs—Combination Approaches for Cancer Therapy," Decision Options®, LLC. Feb. 13, 2012.

"Portfolio Management of Generation Assets," Decision Options®, LLC. Jan. 30-Feb. 1, 2012.

"Value Through Better & Faster Decisions," Decision Options®, LLC. 2013.

Gill Eapen, "Value-Based Management in Biosciences Research and Development," Journal of Applied Corporate Finance, 17(2):105-112 (Spring 2005).

Trappey et al., A patent quality analysis for innovative technology and product development, 2012, Advanced Engineering Informatics 26, pp. 26-34.

* cited by examiner

Fig. 2: Regular Score Calculation Process

Fig. 3: Model Training and Selection Process

Fig. 4: Train Classifier Process

Fig. 5: Changing the number of hidden layers between iterations

MACHINE LEARNING-BASED PATENT QUALITY METRIC

CROSS-REFERENCE TO RELATED APPLICATION

This application is a Continuation Application of U.S. patent application Ser. No. 15/837,652, filed Dec. 11, 2017 which is a continuation of U.S. patent application Ser. No. 14/598,879, filed Jan. 16, 2015, which claims the benefit of and priority to U.S. Provisional Patent Application No. 61/928,806, filed Jan. 17, 2014, the entire contents of each of which are incorporated by reference herein.

BACKGROUND

Field of the Invention

The present disclosure relates to a system comprising a CPU, storage and database of patent grants or applications and other relevant data for computation of an estimation of patent quality utilizing machine learning algorithms for factor selection and classification based on non-linear models.

Related Art

Attempts have been made to assess or to estimate the value or expected life of a patent or a patent application based on historic data about patents. However, testable and reproducible quantitative metrics are difficult to come by. Also, using a combination of quantitative factors available from a universe of patent information to arrive at a patent value or estimated patent life or the like is difficult given the sheer number of patent-related and patent application-related factors and given that each patent represents a unique invention. Therefore, finding the combination of factors that produces an optimal or maximized patent quality/patent life profile has been a difficult task.

Existing methods of patent quality ratings depend on either linear combinations of simple factors (e.g. the number of forward citations combined with age of the patent) or traditional linear and statistical mathematical tools based on an iterative human driven factor selection process. Using a "brute force" approach to finding the most relevant factors entails examining every factor and every combination of factors. The solution space for a machine learning problem should be considered as all possible combinations of factors and coefficients. Therefore, the only way to find the optimal solution using the brute force approach is consider every element in the solution space iteratively; this process is known as brute-force computation. As a simple example for a problem with two factors, A and B, and no coefficients, the algorithm would need to consider at least:

A
B
A+B as the potential solutions to the problem. If a third factor, C, was added, the brute-force approach would then need to consider:

A
B
C
A+B
A+C
B+C
A+B+C

Generally, using a brute-force approach, each additional factor, or combination of factors, increases the complexity and the processing time exponentially.

SUMMARY OF THE DISCLOSURE

A machine-learning based artificial intelligence device for finding an estimate of patent quality is disclosed. Such a device may include:
a patent data retriever configured to receive a first set of patent data comprising at least one of patent application data and patent data for a plurality of patents, and to generate a list of binary classifiers based on the first set of patent data;
a quantitative data scalar configured to assign a standardized scaled score to each binary classifier of the list of binary classifiers;
a binary classifier optimizer configured to generate, using an automated processor, a candidate set of binary classifiers from the list of binary classifiers using a heuristic search and to generate, using the automated processor, a final set of binary classifiers by maximizing iteratively a yield according to a cost function,
wherein the device is configured to provide a signal representing the final set of binary classifiers.

The heuristic search may include an artificial neural network model. The maximizing iteratively may include changing a number of hidden layers of the artificial neural network.

The maximizing iteratively may include using a genetic algorithm or an artificial neural network model and a genetic algorithm.

The cost function may be a receiver operating characteristic and the yield may be calculated according an area under a curve.

The estimate of patent quality may represent an estimate of a lifetime of the patent.

The patent data retriever may be configured to receive a second set of patent data comprising at least one of patent application data and patent data for a plurality of patents, and wherein the device may be configured to test a validity of the final set of binary classifiers using the second set of patent data.

The device may also include a user information manager configured to receive patent information for a target patent and to report the estimate of patent quality according to the final set of binary classifiers.

Also contemplated is a system that includes such a device in combination with a second device communicatively connected to the device over a network. Such a second device may include:
a second automated processor;
a user interface receiving the patent information for the target patent;
an estimate requester requesting from the device the estimate of patent quality for the target patent; and
the user interface providing to a user a signal representing the estimate of patent quality.

Further aspects of the disclosure are explained in the description below and in the accompanying Drawings.

DETAILED DESCRIPTION OF THE DISCLOSURE

A computer system, network platform including a server computer, a processor-readable medium, a method, and means for implementing the method according to the present disclosure employs a set of algorithms based on training data receive from a database of patent information, including granted patents and patents applications in addition to other relevant patent data, including aggregate data for patent examination, grant, opposition, abandonment, annuity/maintenance fee payment, and the like. A device or a system according to the present disclosure implements a suite of binary classifiers to predict a measure of patent quality, for example, whether a given issued patent will be maintained over the lifetime of that patent. Other measures of quality may include whether a patent will be licensed or upheld against legal challenge, and the like. The system may also be adapted to predict a measure of quality of other intangible assets.

Supervised machine learning algorithms are used to select an optimal set of input factors from a number of raw and computed inputs and then to find a set of binary classifier from a set of classifiers, for example using Naïve Bayes Classifier (NBC), Artificial Neural Network (ANN) or Support Vector Machines (SVC). The disclosed invention trains classifiers to represent a prediction based on a non-linear computation of the input factors.

The system selects features using a heuristic search procedure such as a genetic algorithm or simulated annealing. The algorithms accept as input a series of features identified from information for a set of patents and patent applications. A random or pseudo-random initial weight for each feature is assigned and the search proceeds to iterate over the input set of data. At each iteration the heuristic evaluates a cost function and determines whether the current state of feature weights is more optimal than the previous state. The final step is to mutate the feature weights before starting the next iteration. The mutation computation varies based on the algorithm; in a genetic algorithm, the weights are mutated randomly or pseudo-randomly, while using simulated annealing the weights are modified according to an energy transition equation. The heuristic terminates after a given number of iterations or when the changes to the feature weight drops below a given threshold. The threshold may be a user-defined parameter chosen based on experience with the system. The final selected factors are used to train a binary classifier.

Figure 1:
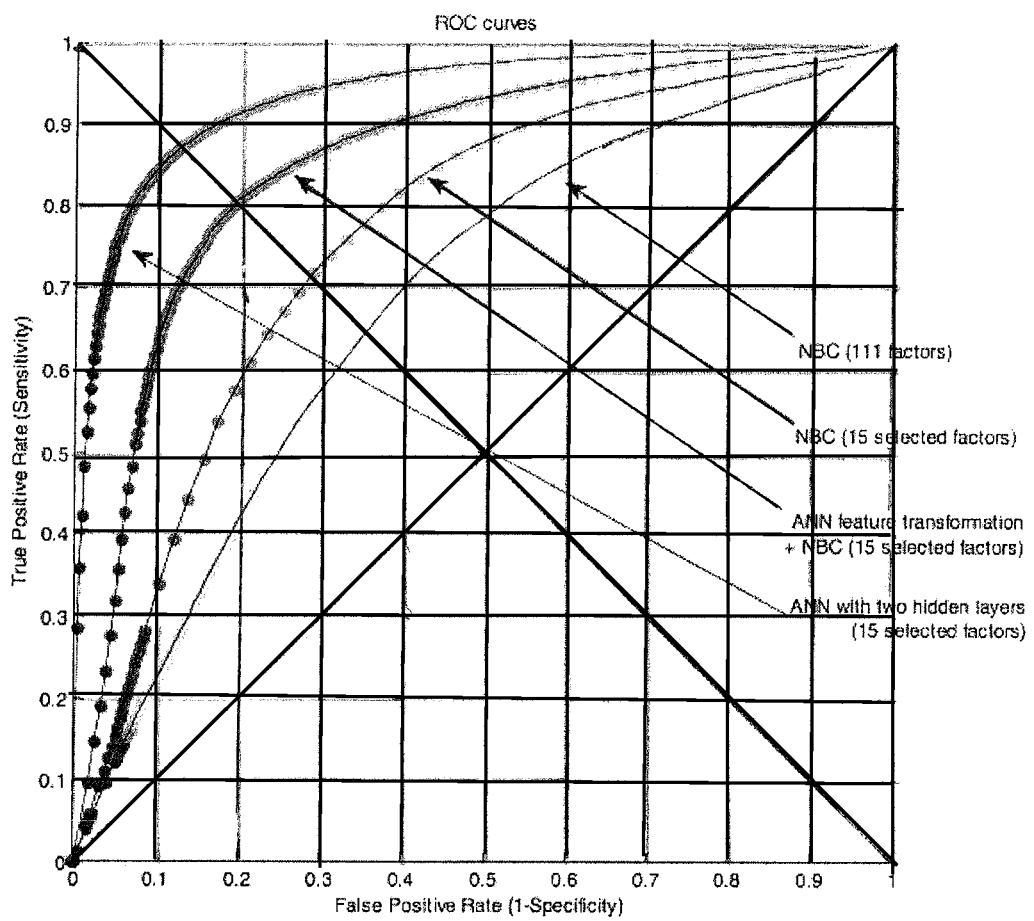
FIG. 1 is an example of ROC (Receiver Operating Characteristic) curves generated by a heuristic such as NBC or ANN, according to an aspect of the present disclosure.

The cost function utilized by the search procedure heuristic is used to optimize the area under a Receiver Operating Characteristic (ROC) curve (FIG. 1). At each iteration, the current set of factors under consideration—as identified by those with non-zero factor weights—are used to train a binary classifier.

A larger sampling may yield a more accurate result for the model. For example, 100,000 patent records may be used and divided into the three sets to yield good sampling sets. The sets need not be of equal size. However, it will be understood that more than 100,000 or fewer than 100,000 records may be used. The training, validation and testing sets need not necessarily follow particular size guidelines and may be dependent on the size of the total population. For example, four million active U.S. patents versus 1.5 million active EPO patents may have different training set sizes. The machine learning may be customized for country or region, such that patent value/estimate of patent quality returned for a patent queried may be based only on data obtained from patent information for the country or region of the patent queried. Similarly, the patent value/estimate of patent quality may be customized for a given field of technology or scientific endeavor, for example, mechanical arts, pharmaceuticals, chemical fields, computer-related technology, and the like. In this way, the patent value/estimate of patent quality returned for queried patent of field of technology or scientific endeavor X may be based only on data obtained based on patents/patent applications of field X.

The resultant binary classifier is evaluated against the cross-validation set and an ROC curve is computed. FIG. 1 shows the results of several iterations of factor selection and additionally demonstrates that the search heuristic can select an optimal binary classification algorithm in addition to the input factors.

Specificity is defined as the number of true negatives divided by the total number of negatives. For example, in a data set with ten total negatives and finding two of them, specificity equals 2/10 or 0.2. The false positive rate is then 1-0.2 which equals 0.8. "ANN" refers to the artificial neural network classifier, and "NBC" refers to the Naïve Bayes classifier.

The system maintains a database of raw patent factors that are derived from the patent publication such as the number of claims, number of citations, countries of issuance, patent litigation and licensing, are also stored in the database. Additional such factors may include:

TABLE 1

Raw Factors

| | |
|---|---|
| Issuing countries | Priority |
| Application Date | Foreign Priority |
| Issuance Date | Number of Assignees |
| Length of Pendency | Number of Licensees |
| Number of Inventors | Number of Attorneys |
| Number of Figures | Number of Office Actions |
| Number of Claims | PCT Issuance |
| Number of Independent Claims | Patent Family Size |
| Number of Dependent Claims | Number of words in Description |
| Average Number of Words in Claims | Number of words in Title |
| Total number of words in claims | Number of Backward Citations |
| Number of different words in claims | Number of Forward Citations |
| Claim Type | Number of Patent Classifications |
| Number of words in Abstract | Number of Foreign Citations |

From these raw factors, the input features to be evaluated by the search heuristic are calculated through a number of methods including:

1. Linear combination (e.g., adding factors together)
2. Non-linear calculations (e.g., squaring a factor or taking the square root)
3. Ratios of raw factors (e.g., number of patents with 10 claims against all the total number of all patients)

These methods produce around 200 features, with approximately 30 from raw factors, 50 ratio factors and the rest being combinations. With a base set of features calculated, the set of available features can be further expanded by computing linear and non-linear combinations of all features to be evaluated by the search heuristic. This expansion results in a combinatorial increase in the number of available features. The binary classifiers are trained using supervised machine learning with three sets of data: training set, cross-validation set, and a testing set. The input sets comprise a random or pseudo-random sampling of issued patents from a given patent office. In a preferred embodiment, the system then creates multiple binary classifiers, each predicting the maintenance of patent for a given maintenance period. The final output of each classifier is combined into a final score.

A significant advantage of the use of machine learning when identifying input factors and computing the classification model is that the model can be continuously updated in response to changes in the market, such as increased rates of abandonment or litigation- or to the availability of additional raw factors. In this way the rating can be constantly maximized for prediction accuracy.

Figure 2:
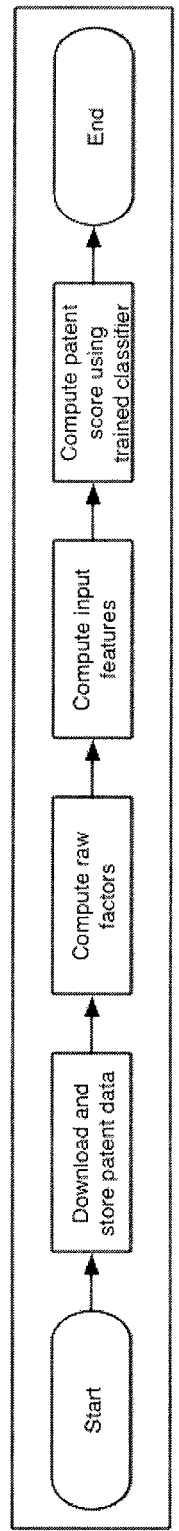
FIG. 2 is an example of an overview of a machine learning approach, according to an aspect of the present disclosure.
Figure 3:
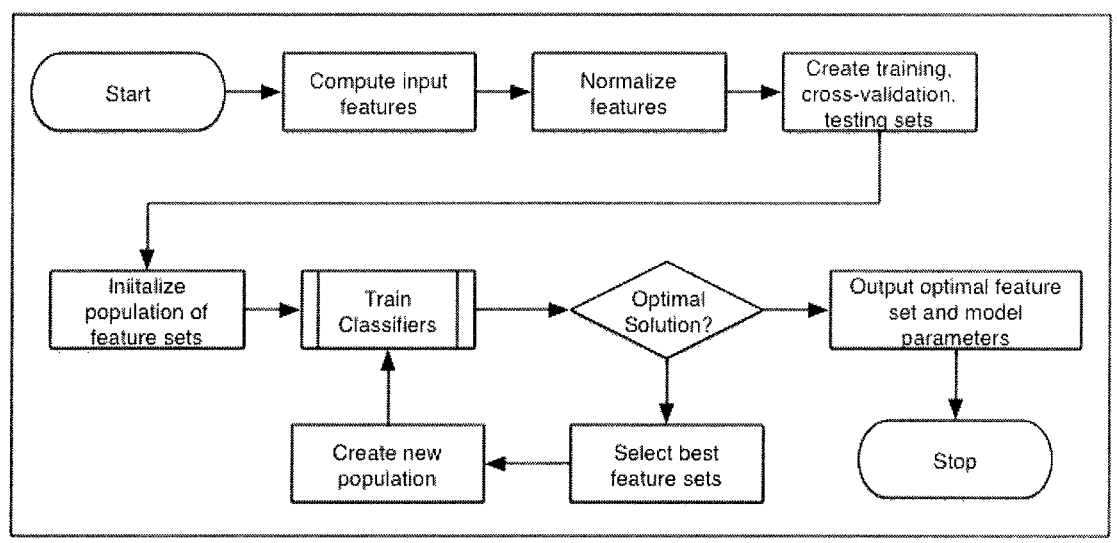
FIG. 3 is an example of a more detailed overview of a machine learning approach, according to an aspect of the present disclosure.
Figure 4:
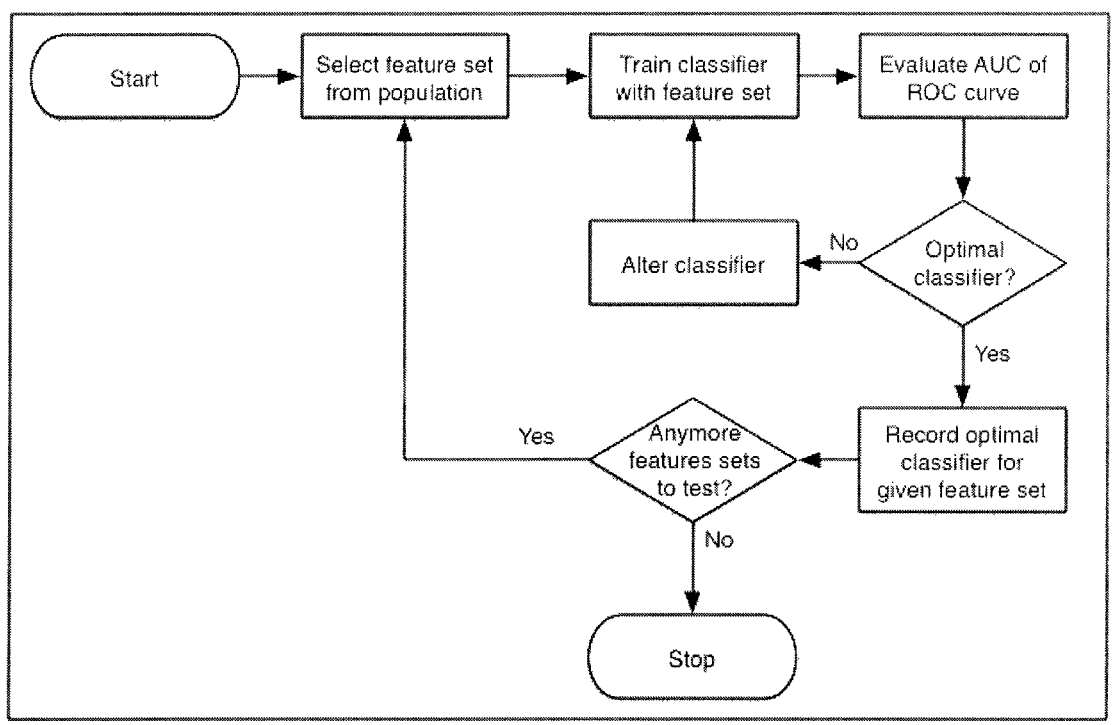
FIG. 4 is an example of a classifier selection process, according to an aspect of the present disclosure.

The system effectively works in two different phases. The first phase, described in FIG. 2, is used in the regular computation of the patent scores. It utilizes the classifier and parameters that were calculated during the second phase (FIG. 3 and FIG. 4).

For regular score computation, the system starts by downloading the electronic record for each published and granted patent from a given patent office (e.g., the European Patent Office) and stores the downloaded information in a database. In a preferred embodiment, the download process runs automatically in response to external events; e.g., if the issued patents are published on Tuesday morning, the system may automatically start to download that week's issued patents on Tuesday afternoon.

Most patent offices publish the patent data in a standardized XML format. The downloading process parses the data from the XML and stores the information in the database. The system then proceeds to compute the input features to the classifier using the raw factors from the patent record. The final score is computed using the trained classifier and then saved with the patent record.

In addition to information in the electronic record stored, additional raw factors may be calculated from the data in the electronic record. A list of raw factors can be found in Table 1. However, it will be understood that such a list is not exhaustive and that many other such raw factors may be used in addition to, or instead of those listed.

The system computes the model by first computing a set of features from the electronic patent data stored in the database. The features fall into two categories. The first category is the raw factors on a patent basis from Table 1. The second are features that are computed over multiple records of patent data (i.e., over the entire set or over a subset). A list of the features considered when training the model is listed in Table 2.

TABLE 2

| | Computed Features | |
|---|---|---|
| | pcnt_abandoned | Number of patents abandoned by year of patent against total number patents filed on a given date |
| AB | abandyear | Number of years after issuance the patent was abandoned, or 20 if still in-force |
| Percent abandoned grouped by assignee based on the patents in the period (now-4.5 years) and (now-8.5 years) | | |
| | pcnt_abandoned_assg | Percentage of patents abandoned by the assignee in the given date range |
| A | pcnt_abandoned_assg_avg | Average percentage of patents abandoned by the assignee in the given date range |
| C | pcnt_abandoned_assg_stdev | Standard deviation of percentage of patents abandoned by the assignee in the given date range |
| E | pcnt_abandoned_assg_median | Median percentage of patents abandoned by the assignee in the given date range |
| Percent abandoned grouped by assignee based on the patents in the period (now-4.5 years) and (now-16.5 years) | | |
| | pcnt_abandoned_assg_16 | Percentage of patents abandoned by the assignee in the given date range |
| B | pcnt_abandoned_assg_16_avg | Average percentage of patents abandoned by the assignee in the given date range |
| D | pcnt_abandoned_assg_16_stdev | Standard deviation of percentage of patents abandoned by the assignee in the given date range |

TABLE 2-continued

| | Computed Features | |
|---|---|---|
| F | pcnt_abandoned_assg_16_median | Median percentage of patents abandoned by the assignee in the given date range |

Percent abandoned grouped by attorney based on the patents in the period (now-4.5 years) and (now-8.5 years)

| | | |
|---|---|---|
| | pcnt_abandoned_atty | Percentage of patents abandoned by attorney in the given date range |
| | pcnt_abandoned_atty_avg | Average percentage of patents abandoned by attorney in the given date range |
| | pcnt_abandoned_atty_stdev | Standard deviation of percentage of patents abandoned by attorney in the given date range |
| | pcnt_abandoned_atty_median | Median percentage of patents abandoned by attorney in the given date range |

Percent abandoned grouped by attorney based on the patents in the period (now-4.5 years) and (now-16.5 years)

| | | |
|---|---|---|
| | pcnt_abandoned_atty_16 | Percentage of patents abandoned by attorney in the given date range |
| | pcnt_abandoned_atty_16_avg | Average percentage of patents abandoned by attorney in the given date range |
| | pcnt_abandoned_atty_16_stdev | Standard deviation of percentage of patents abandoned by attorney in the given date range |
| | pcnt_abandoned_atty_16_median | Median percentage of patents abandoned by attorney in the given date range |

Data calculated based on the legal status codes of the patents.

| | | |
|---|---|---|
| G | impact_plus | Count of positive legal status codes |
| H | impact_minus | Count of negative legal status codes |
| I | impact_neutral | Count of neutral legal status codes |
| J | assg_avg_ip | Average of Impact Plus per assignee |
| K | assg_avg_im | Average of Impact Minus per assignee |
| L | assg_avg_in | Average of Impact Neutral per assignee |
| M | assg_stdev_ip | Standard deviation of Impact Plus per assignee |
| N | assg_stdev_im | Standard deviation of Impact Minus per assignee |
| O | assg_stdev_in | Standard deviation of Impact Neutral per assignee |
| P | assg_median_ip | Median of Plus per assignee |
| Q | assg_median_im | Median of Minus per assignee |
| R | assg_median_in | Median of Neutral per assignee |
| S | atty_avg_ip | Average of Impact Plus per attorney |
| T | atty_avg_im | Average of Impact Minus per attorney |
| U | atty_avg_in | Average of Impact Neutral per attorney |
| V | atty_stdev_ip | Standard deviation of Impact Plus per attorney |
| W | atty_stdev_im | Standard deviation of Impact Minus per attorney |
| X | atty_stdev_in | Standard deviation of Impact Neutral per attorney |
| Y | atty_median_ip | Median of Plus per attorney |
| Z | atty_median_im | Median of Minus per attorney |
| AA | atty_median_in | Median of Neutral per attorney |

Data calculated based on the pendency, calculated as (filed - issued)

| | | |
|---|---|---|
| | pendancy_month | Number of months between filing and issuance per patent |

TABLE 2-continued

| | Computed Features | |
|---|---|---|
| | pendancy_month_avg_by_week | Average pendency grouped by week of issuance |
| | pendancy_month_stdev_by_week | Standard deviation of the pendency grouped by week of issuance |
| | pendancy_month_median_by_week | Median pendency grouped by week of issuance |
| | Data calculated based on number of independent claims | |
| | iclaim_avg_by_week | Average number of independent claims group by issuance week |
| AC | iclaim_stdev_by_week | Standard deviation of independent claims group by issuance week |
| AD | iclaim_median_by_week | Median of independent claims group by issuance week |
| AE | iclaim_avg_by_ipc | Average number of independent claims group by International Patent Classification |
| AF | iclaim_stdev_by_ipc | Standard deviation of independent claims group by International Patent Classification |
| AG | iclaim_median_by_ipc | Median of independent claims group by International Patent Classification |

In Table 2, legal status code refers to events during the lifetime of the patent. These include office actions, change of ownership, abandonment, maintenance and expiration. "Week of issuance" may refer to a week number of the year that patent was granted. (e.g. January 1 is week 1, etc). "iClaim" means independent claim, Claim type "A" refers to an apparatus claim, claim type "S" to a system claim, claim type "C" to a claim for a compound, and claim type "M" refers to a method claim. "Pendency" may be the time between the application initial filing date or a provisional initial filing date and the final action, such as a Notice of Allowance or issuance of a patent.

The plus sign ("+") on the appended list of legal status codes indicates those status codes that are positive, meaning having received some positive treatment, the minus sign ("−") indicates those status codes that are negative. Those with neither sign mean neutral treatment. Individual specific legal status codes need not be counted, but a total number of status codes that are positive, negative and neutral may be counted.

In a preferred embodiment, training the model begins by exporting three sets of randomly or pseudo-randomly selected issued patent records. The first is the training set that is used to evaluate a set of parameters in the model to determine how accurate the prediction is. The second is a cross-validation set that is used as second check for the accuracy of the prediction. By using a different set to evaluate a set of parameters instead of the training set, the model achieves a greater level of accuracy. The training and cross-validation sets are both used to select parameters in the model. The final set is a testing set that is used to evaluate a complete model for accuracy. The sets are not required to be of any particular size, nor are they required to be the same size.

One further step to prepare for model training is to normalize the input features, with each feature falling between 0 and 1. This step prevents any one set of features from unduly influencing the model. The normalization step produces a scaling weight for each feature that is applied to the features before said feature is used in training or score calculation. For example the range of values for number of backward citations is 0 to 141, so the normalized backward citation for a patent with 40 citations would be 0.28.

What follows is an example of a reduced set of inputs to demonstrate the implementation in model training. Table 3 contains a sample of issued patent records; Table 4 contains a sample training set; Table 5 contains the sample training set with scaled features. In each of Tables 3-5, the columns of each row are continued on the second page of the table (for example, for Table 3, the first column of the second page shows the number of inventors for the documents listed on the first page).

TABLE 3

| doc number | filed | issued | ctry_codes | assignee_name | num_assg | attorney_name | num_atty | bwd cites | fwd cites | inventor_name |
|---|---|---|---|---|---|---|---|---|---|---|
| 20040016127 | Jul. 6, 2004 | Oct. 31, 2007 | AT BE BG CH CY CZ DE DK EE ES FI FR GB GR HU IE IT . . . | KATHREIN-WERK | 1 | Flach, Dieter Dipl.-Ing | 1 | 5 | 0 | ZEHETNER, HERMANN |

TABLE 3-continued

| | | | | | | | | | | |
|---|---|---|---|---|---|---|---|---|---|---|
| 20050000163 | Jan. 4, 2005 | Sep. 9, 2009 | AT BE BG CH CY CZ DE DK EE ES FI FR GB GR HU IE | XEROX CORPORA | 1 | Gronecker, Kinkeldey, Stockmair & Schwanh? §usse | 1 | 5 | 0 | FRAZIER, ISAAC S. |
| 19870810708 | Dec. 1, 1987 | Aug. 28, 1991 | CH DE FR GB LI | LOOSER GOTTLIE | 1 | Ritscher, Thomas, Dr. | 1 | 3 | 1 | LOOSER, GOTTLIEB |
| 20060300035 | Jan. 17, 2006 | Apr. 9, 2008 | AT BE BG CH CY CZ DE DK EE ES FI FR GB GR HU IE IS . . . | ALCATEL LUCEN | 1 | Hervouet, Sylvie | 1 | 4 | 0 | ROBISON, ANDREW |
| 20060002755 | Feb. 7, 2006 | May 14, 2008 | AT BE BG CH CY CZ DE DK EE ES FI FR GB GR HU IE | SONY CORPORAT | 1 | MUELLER & HOFFMANN Patentanwolte | 1 | 5 | 0 | KOIZUMI, YOSHIHIRO |
| 20050734111 | Mar. 22, 2005 | Oct. 19, 2011 | AT BE BG CH CY CZ DE DK EE ES FI FR GB GR HU IE | TRW AUTOMOTIV | 1 | Sties, Jochen | 1 | | | HANSEMANN, VOLKER |
| 20050077290 | Dec. 17, 2002 | Aug. 29, 2012 | AT BE BG CH CY CZ DE DK EE ES FI FR GB GR IE IT LI . . . | BIOSENSE WEBST | 1 | Mercer, Christopher Paul | 1 | 2 | 0 | GOVARI, ASSAF |
| 20040819222 | Nov. 23, 2004 | Jan. 30, 2013 | AT BE BG CH CY CZ DE DK EE ES FI FR GB GR HU IE IS . . . | Novartis AG | 1 | Leon, Susanna Iris | 1 | | | BAESCHLIN, DANIEL KASPAR |

| num invt | 1st claim_type | 1st claim total_words | 1st claim diff_words | title | abstract | claim_one |
|---|---|---|---|---|---|---|
| 1 | A | 112 | 64 | LIGHTNING ARRESTER FOR ANTENNA ARRANGEMENTS | An antenna installation lightning protection unit has a radio transparent protective housing (5) . . . | Lightning protection device for antenna systems, with a plurality of radiator elements and radiator arrangements (3) arranged offset . . . |
| 4 | A | 181 | 79 | IMPROVED REPLACEMENT METHOD AND ASSEMBLY FOR PAPER PICK ROLLERS | A sheet feeder and separator assembly for separating and sequentiallyfeeding individual print media sheets . . . | A sheet feeder and separator assembly (11) for separating and sequentially feeding individual print media sheets . . . |
| 1 | M | 170 | 64 | WINDING METHOD AND APPARATUS | A method of winding a continuously moving web (10), such as a flexible polymer film . . . | A method of winding a continuously moving web (10) consisting of an essentially flexible material . . . |
| 1 | M | 122 | 45 | METHOD FOR CONTROLLING A PROCESS RESOURCE ACCESS VIA A PARENT PROCESS | The invention provides a system and a method for controlling a request for a resource from a process . . . | A method for controlling a request for a resource from a process (110) operating on a microprocessor-enabled machine (100) . . . |

TABLE 3-continued

| | | | | | | | |
|---|---|---|---|---|---|---|---|
| 6 | A | 160 | 60 | RECORDING APPARATUS, REPRODUCTION APPARATUS AND CONTROL METHOD | A recording apparatus includes: recording means having a drive part including rotational drive means for rotating an optical . . . | A recording apparatus comprising: recording means (8) having a drive part (91. 87) including rotational drive . . . |
| 3 | S | 107 | 57 | RUBBER BEARING, ESPECIALLY FOR A MOTOR PUMP UNIT OF A POWER STEERING SYSTEM | The invention relates to a rubber bearing (10), especially for a motor pump unit (12) of a power steering system . . . | A rubber bearing (10), in particular for a motor pump unit (12) of a power steering system . . . |
| 1 | M | 199 | 92 | IMPLANTABLE AND INSERTABLE PASSIVE TAGS | Apparatus for determining the position of an object within a body of a subject includes at least one acoustic wave generator . . . | Apparatus (20) for determining the position of an object (22) within a body of a subject, comprising: at least one acoustic wave generator (11, 13, 15) . . . |
| 3 | C | 411 | 85 | ORGANIC COMPOUNDS | Disclosed are (E¥-amino-ceú-hydroxy-ceâ-aryl-alkanoic acid amide compounds of formula (I) and the salts thereof, having renin-inhibiting properties . . . | A compound having formula (I)whereinR1 is hydrogen, halogen, optionally halogenated alkyl, . . . |

TABLE 4

| document # | A pcnt_abandone | B pcnt_abandone | C pcnt_abandone | D pcnt_abandone | E pcnt_abandoned_assg_ | F pcnt_abandone | G impact_plus | H impact_minus |
|---|---|---|---|---|---|---|---|---|
| 20040016127 | 0.0195241 | 0.101213 | 0.0126767 | 0.07313 | 0.0161905 | 0.0926465 | 5 | 23 |
| 20050000163 | 0.0214966 | 0.121255 | 0.0150865 | 0.0899635 | 0.0163899 | 0.107652 | 5 | 0 |
| 19870810708 | 0 | 0 | 0.212828 | 0.212828 | 0.13399 | 0.13399 | 5 | 5 |
| 20060300035 | 0.0345951 | 0.118892 | 0.0100198 | 0.0738601 | 0.0345279 | 0.105121 | 6 | 22 |
| 20060002755 | 0.0188527 | 0.109995 | 0.0143231 | 0.0864105 | 0.0157964 | 0.0979499 | 6 | 3 |
| 20050734111 | 0.0265622 | 0.0524952 | 0.0153431 | 0.0328344 | 0.0302613 | 0.0476627 | 3 | 14 |
| 20050077290 | 0.0197951 | 0.0527218 | 0.0133056 | 0.0506772 | 0.0161905 | 0.0371031 | 4 | 5 |
| 20040819222 | 0.0352521 | 0.068873 | 0.00294144 | 0.0384033 | 0.0346951 | 0.0560363 | 4 | 1 |
| 19850309337 | 0.0238328 | 0.176999 | 0.0138066 | 0.0855378 | 0.0215054 | 0.178412 | 5 | 7 |
| 19810400286 | 0 | 0 | 0.212828 | 0.212828 | 0.13399 | 0.13399 | 3 | 5 |

| document # | R assg_median_in | S atty_avg_ip | T atty_avg_im | U atty_avg_in | V atty_stdev_ip | W atty_stdev_im | X atty_stdev_in | Y atty_median_ip |
|---|---|---|---|---|---|---|---|---|
| 20040016127 | 8 | 5.13158 | 8.39474 | 6 | 1.50981 | 7.29139 | 3.77044 | 5 |
| 20050000163 | 2 | 3.9665 | 2.25741 | 2.93347 | 1.64693 | 4.29542 | 3.12237 | 4 |
| 19870810708 | 11 | 0 | 0 | 0 | 0 | 0 | 0 | 0 |
| 20060300035 | 3 | 5.09155 | 12.3169 | 5.76761 | 1.30414 | 7.16608 | 2.81502 | 5 |
| 20060002755 | 1 | 4.17358 | 1.09065 | 2.21382 | 1.67789 | 2.31697 | 2.15989 | 4 |
| 20050734111 | 2 | 3.66735 | 3.86448 | 4.77207 | 1.65807 | 5.67121 | 3.70177 | 4 |
| 20050077290 | 3 | 4.59333 | 5.99333 | 9.4 | 1.21012 | 4.6074 | 4.17085 | 5 |
| 20040819222 | 11 | 2.94545 | 3.4 | 6.21818 | 1.39335 | 5.46233 | 6.47128 | 3 |
| 19850309337 | 1 | 0 | 0 | 0 | 0 | 0 | 0 | 0 |
| 19810400286 | 3 | 4 | 1 | 2 | 0 | 0 | 0 | 4 |

| I impact_neutral | J assg_avg_ip | K assg_avg_im | L assg_avg_in | M assg_stdev_ip | N assg_stdev_im | O assg_stdev_in | P assg_median_ip | Q assg_median_im |
|---|---|---|---|---|---|---|---|---|
| 7 | 4.65094 | 9.36792 | 6.59434 | 1.70736 | 7.39669 | 3.77152 | 5 | 11 |
| 2 | 5.09486 | 0.598155 | 1.8621 | 1.43756 | 1.28656 | 1.62292 | 5 | 0 |
| 3 | 3 | 10 | 11 | 0 | 0 | 0 | 3 | 10 |
| 7 | 4.35834 | 6.16016 | 4.11809 | 1.49673 | 6.77812 | 3.46319 | 4 | 1 |
| 3 | 3.97511 | 0.785045 | 1.84866 | 1.63357 | 1.59374 | 2.12393 | 4 | 0 |
| 9 | 3.89091 | 1.89091 | 2.27273 | 1.27181 | 2.41655 | 2.15557 | 4 | 1 |
| 9 | 4.3399 | 4.59606 | 4.38424 | 1.50502 | 5.90556 | 4.01114 | 5 | 1 |
| 11 | 3.77778 | 5.33333 | 8.22222 | 1.71594 | 4.8734 | 5.35672 | 4 | 4 |
| 5 | 3.17966 | 4.89401 | 3.57559 | 1.26971 | 5.73916 | 4.12182 | 3 | 1 |
| 2 | 4.08772 | 2.4386 | 3.29825 | 1.55692 | 3.07193 | 2.45283 | 4 | 1 |

| Z atty_median_im | AA atty_median_in | AB abandyear | AC iclaim_stdev_by | AD iclaim_median_ | AE iclaim_avg_by_ | AF iclaim_stdev_by | AG iclaim_median_by_ipc |
|---|---|---|---|---|---|---|---|
| 9 | 7 | 20 | 4.87303 | 2 | 2.85074 | 3.15911 | 2 |
| 1 | 2 | 20 | 4.01328 | 2 | 3.24691 | 3.58188 | 2 |

TABLE 4-continued

| | | | | | | | |
|---|---|---|---|---|---|---|---|
| 0 | 0 | 9 | 2.47977 | 1 | 3.24691 | 3.58188 | 2 |
| 15 | 7 | 20 | 4.52145 | 2 | 3.40922 | 3.65869 | 2 |
| 0 | 2 | 6 | 4.03512 | 2 | 3.54489 | 3.6441 | 2 |
| 1 | 4 | 20 | 4.52227 | 2 | 2.78329 | 3.07821 | 2 |
| 7 | 9 | 20 | 4.56603 | 2 | 3.73529 | 4.29976 | 2 |
| 1 | 3 | 20 | 4.04123 | 2 | 3.11477 | 3.58162 | 2 |
| 0 | 0 | 8 | 2.34696 | 1 | 3.91159 | 4.03486 | 2 |
| 1 | 2 | 13 | 2.68575 | 1 | 3.30404 | 3.5839 | 2 |

TABLE 5

| document # | A pcnt_abandone | B pcnt_abandone | C pcnt_abandone | D pcnt_abandoned_ | E pcnt_abandone | F pcnt_abandone | G impact_plus | H impact_minus |
|---|---|---|---|---|---|---|---|---|
| 20040016127 | 0.0195241 | 0.101213 | 0.0126767 | 0.07313 | 0.0161905 | 0.0926465 | 0.666666667 | 1 |
| 20050000163 | 0.0214966 | 0.121255 | 0.0150865 | 0.0899635 | 0.0163899 | 0.107652 | 0.666666667 | 0 |
| 19870810708 | 0 | 0 | 0.212828 | 0.212828 | 0.13399 | 0.13399 | 0.666666667 | 0.217391304 |
| 20060300035 | 0.0345951 | 0.118892 | 0.0100198 | 0.0738601 | 0.0345279 | 0.105121 | 1 | 0.956521739 |
| 20060002755 | 0.0188527 | 0.109995 | 0.0143231 | 0.0864105 | 0.0157964 | 0.0979499 | 1 | 0.130434783 |
| 20050734111 | 0.0265622 | 0.0524952 | 0.0153431 | 0.0328344 | 0.0302613 | 0.0476627 | 0 | 0.608695652 |
| 20050077290 | 0.0197951 | 0.0527218 | 0.0133056 | 0.0506772 | 0.0161905 | 0.0371031 | 0.333333333 | 0.217391304 |
| 20040819222 | 0.0352521 | 0.068873 | 0.00294144 | 0.0384033 | 0.0346951 | 0.0560363 | 0.333333333 | 0.043478261 |
| 19850309337 | 0.0238328 | 0.176999 | 0.0138066 | 0.0855378 | 0.0215054 | 0.178412 | 0.666666667 | 0.304347826 |
| 19810400286 | 0 | 0 | 0.212828 | 0.212828 | 0.13399 | 0.13399 | 0 | 0.217391304 |

| document # | R assg_median_in | S atty_avg_ip | T atty_avg_im | U atty_avg_in | V atty_stdev_ip | W atty_stdev_im | X atty_stdev_in | Y atty_median_ip |
|---|---|---|---|---|---|---|---|---|
| 20040016127 | 0.580645161 | 0.833333333 | 0.567968942 | 0.531914894 | 0.749855473 | 0.833333333 | 0.485535062 | 0.833333333 |
| 20050000163 | 0.096774194 | 0.649196545 | 0.152731207 | 0.260059397 | 0.817956878 | 0.499508332 | 0.402080423 | 0.666666667 |
| 19870810708 | 0.822580645 | 0 | 0 | 0 | 0 | 0 | 0 | 0 |
| 20060300035 | 0.177419355 | 0.833333333 | 0.833333333 | 0.833333333 | 0.511312943 | 0.647708332 | 0.3625017 | 0.833333333 |
| 20060002755 | 0.016129032 | 0.757181246 | 0.151647748 | 0.196260638 | 0.833333333 | 0.340457915 | 0.278137916 | 0.666666667 |
| 20050734111 | 0.096774194 | 0.665339743 | 0.537330666 | 0.423055851 | 0.833333333 | 0.833333333 | 0.476692143 | 0.666666667 |
| 20050077290 | 0.177419355 | 0.833333333 | 0.833333333 | 0.833333333 | 0.723747324 | 0.702905171 | 0.537097504 | 0.833333333 |
| 20040819222 | 0.822580645 | 0.613635417 | 0.833333333 | 0.833333333 | 0.833333333 | 0.833333333 | 0.833333333 | 0.625 |
| 19850309337 | 0.071428571 | 0 | 0 | 0 | 0 | 0 | 0 | 0 |
| 19810400286 | 0.5 | 0.5 | 0.5 | 0.5 | 0 | 0 | 0 | 0.5 |

| I impact_neutral | J assg_avg_ip | K assg_avg_im | L assg_avg_in | M assg_stdev_ip | N assg_stdev_im | O assg_stdev_in | P assg_median_ip | Q assg_median_im |
|---|---|---|---|---|---|---|---|---|
| 0.555555556 | 0.606096345 | 0.771550103 | 0.436428682 | 0.829166521 | 0.833333333 | 0.586727201 | 0.722222222 | 0.833333333 |
| 0 | 0.725627869 | 0.010383305 | 0.032690867 | 0.698140184 | 0.15817562 | 0.252474151 | 0.722222222 | 0 |
| 0.111111111 | 0.212013535 | 0.824128884 | 0.812303858 | 0 | 0 | 0 | 0.166666667 | 0.833333333 |
| 0.555555556 | 0.675511116 | 0.817858725 | 0.314645335 | 0.46097416 | 0.802351215 | 0.373033589 | 0.444444444 | 0.208333333 |
| 0.111111111 | 0.5372749 | 0.027202025 | 0.044080071 | 0.592127358 | 0.054846103 | 0.089827276 | 0.444444444 | 0 |
| 0.777777778 | 0.505670097 | 0.077381064 | 0.056476005 | 0.245401395 | 0.093784103 | 0.091656022 | 0.444444444 | 0.05 |
| 0.777777778 | 0.674200271 | 0.594540578 | 0.241508653 | 0.468919644 | 0.744852162 | 0.458792602 | 0.722222222 | 0.05 |
| 1 | 0.522563281 | 0.760252149 | 0.772491776 | 0.671074222 | 0.545407915 | 0.760100318 | 0.666666667 | 0.8 |
| 0.333333333 | 0.269287447 | 0.750428615 | 0.567148153 | 0.2978666 | 0.740863421 | 0.723731199 | 0.25 | 0.5 |
| 0 | 0.5 | 0.5 | 0.5 | 0.5 | 0.5 | 0.5 | 0.5 | 0.5 |

| Z atty_median_im | AA atty_median_in | AB abandyear | AC iclaim_stdev_by | AD iclaim_median_ | AE iclaim_avg_by_ | AF iclaim_stdev_by_ | AG iclaim_median_by_ipc |
|---|---|---|---|---|---|---|---|
| 0.5 | 0.648148148 | 0.791666667 | 0.733254076 | 0.7545115 | 0.252954271 | 0.258251691 | 0.258251691 |
| 0.055555556 | 0.185185185 | 0.791666667 | 0.587172044 | 0.592978587 | 0.413524065 | 0.414998977 | 0.4)4998977 |
| 0 | 0 | 0.21875 | 0.218377404 | 0.167200864 | 0.413524065 | 0.414998977 | 0.414998977 |
| 0.833333333 | 0.648148148 | 0.791666667 | 0.683449185 | 0.734071547 | 0.479309165 | 0.443477249 | 0.443477249 |
| 0 | 0.185185185 | 0.0625 | 0.631837212 | 0.599042444 | 0.534296933 | 0.438067823 | 0.438067823 |
| 0.119047619 | 0.37037037 | 0.772727273 | 0.627210769 | 0.734299219 | 0.225616429 | 0.228257001 | 0.228257001 |
| 0.833333333 | 0.833333333 | 0.772727273 | 0.721785122 | 0.746449145 | 0.564678497 | 0.625197872 | 0.625197872 |
| 0.833333333 | 0.833333333 | 0.772727273 | 0.705118442 | 0.728038015 | 0.282891905 | 0.362413839 | 0.362413839 |
| 0 | 0 | 0.173913043 | 0.514594639 | 0.348904211 | 0.618507263 | 0.591346991 | 0.591346991 |
| 0.5 | 0.5 | 0.5 | 0.5 | 0.5 | 0.5 | 0.5 | 0.5 |

Examples of additional factors that may be used and heuristically searched are provided in the following lists.

List Part 1

| | |
|---|---|
| CCRE− | BE: expiry of a complementary protection certificate |
| EN− | FR: translation not filed |
| EN3− | FR: translation not filed ** decision concerning opposition |
| EUG− | SE: european patent has lapsed |
| FDY− | File destroyed |
| FITB− | IT: spc for herbicidal products: suspended |
| FITG− | IT: spc for herbicidal products: definitive refusal |
| FITM− | IT: spc for herbicidal products: withdrawal of spc application |
| FITN− | IT: spc for herbicidal products: annulment of spc |
| FITO− | IT: spc for herbicidal products: expiry |
| FITP− | IT: spc for herbicidal products: renunciation of spc |
| GBAW− | GB: application withdrawn |
| GBDW− | GB: gb designation withdrawn |
| GBGD− | GB: date of publication of the new specification of the patent under article 103 (1977) ** grant date withdrawn |
| GBGR− | GB: grant date revoked |
| GBGW− | GB: grant date withdrawn |
| GBPC− | GB: european patent ceased through non-payment of renewal fee |
| GBPR− | GB: patent revoked under art. 102 of the ep convention designating the uk as contracting state |
| GBV− | GB: ep patent (uk) treated as always having been void in accordance with gb section 77(7)/1977 |
| LTIE− | LT: invalidation of european patent or patent extension |
| LTLA− | LT: lapse of european patent or patent extension |
| R29U− | Interruption of proceedings (correction) [after grant] |
| RVAA− | Decision on revocation request is admissible (for revocation filed after opposition period) |
| RVDA− | Decision on revocation request is admissible (for revocation filed during opposition period) |
| RX1− | Cancellation of first publication |
| RX2− | Cancellation of second publication |
| X− | Document not published |
| X1− | No entry under this number |
| 17A+ | Application maintained |
| 17P+ | Request for examination filed |
| 17Q+ | First examination report |
| 18RA+ | Date of receipt of request for re-establishment of rights |
| 18RR+ | Re-established |
| 19F+ | Date of resumption (after stay of proceedings) [before grant] |
| 19W+ | Date of resumption (after interruption of proceedings)[before grant] |
| 25N+ | Valid in all designated states |
| 26D+ | Opposition deemed not to have been filed |
| 26N+ | No opposition filed |
| 26U+ | Inadmissible opposition |
| 27C+ | Termination of opposition procedure |
| 27O+ | Opposition rejected |

List Part 2

| | |
|---|---|
| 28+ | Re-established |
| 29F+ | The resumption of a previous incorrect announcement of a suspension of proceedings (correction) [after grant] |
| 29W+ | Date of resumption (after interruption of proceedings) [after grant] |
| 31R+ | Resumption |
| 31W+ | Resumption |
| A4+ | Supplementary search report |
| A5+ | Separate publication of the ep or int. search report |
| AK+ | Designated contracting states: |
| AKX+ | Payment of designation fees |
| AX+ | Extension or validation of the european patent to |
| AXX+ | Payment of extension fees |
| BERR+ | BE: reestablished |
| CCHV+ | BE: grant of a complementary protection certificate for herbicides |
| CCPV+ | BE: grant of a complementary protection certificate |
| D19F+ | Previously announced "resumption after interruption of proceedings" was erroneous |
| D25+ | Lapsed in a contracting state (deleted) |
| DBV+ | Designated contracting states (deleted) |
| EAL+ | SE: european patent in force in sweden |
| EL+ | FR: translation of claims filed |
| EL1+ | FR: translation or corrected translation of claims filed |
| EM+ | FR: revised translation of claims filed |
| GBTC+ | GB: corrected translation (of ep patent) filed (gb section 80(3)/1977) |
| IECL+ | IE: translation for ep claims filed |
| INTG+ | Announcement of intention to grant |
| ITCL+ | IT: translation for ep claims filed |
| ITF+ | IT: translation for a ep patent filed |
| MEDD+ | IT: spc for pharmaceutical products: granted |
| NLE+ | NL: notifications concerning applications |
| NLR3+ | NL: receipt of modified translations in the netherlands language after an opposition procedure |
| NLR4+ | NL: receipt of corrected translation in the netherlands language at the initiative of the proprietor of the patent |
| PGFP+ | Postgrant: annual fees paid to national office |
| PGRI+ | Postgrant: patent reinstated in contracting state |
| R17C+ | Date of despatch of first examination report |
| R17P+ | Request for examination filed (correction) |
| R18X+ | Re-established (correction) |
| R19F+ | The resumption of a previous incorrect announcement of a stay of proceedings (correction) [before grant] |
| R19W+ | Resumption after interruption of proceedings (correction) [before grant] |
| R26D+ | Opposition deemed not to have been filed (corr.) |
| R26U+ | Inadmissible opposition (correction) |
| R27A+ | Maintained as amended (correction) |

List Part 3

| | |
|---|---|
| EN4+ | FR: notification of non filing translation in an earlier bopi is erroneous |
| EPTA+ | LU: last paid annual fee |
| ET+ | FR: translation filed |
| ET1+ | FR: translation filed ** revision of the translation of the patent or the claims |
| ET2+ | FR: translation filed ** revision of the translation of the modified patent after opposition |
| ET3+ | FR: translation filed ** decision concerning opposition |
| ETR+ | FR: translation filed ** restoration of the right |
| FITD+ | IT: spc for herbicidal products: granted |
| GBA+ | GB: translation amended (gb section 77(6)(a)/1977) |
| GBAT+ | GB: amendment of translation allowed (of ep patent) (gb sect. 80 (3)/1977) |
| GBC+ | GB: translation of claims filed (gb section 78(7)/1977) |
| GBC8+ | GB: translation of claims filed (gb section 80(3)/1977) |
| GBCC+ | GB: corrected translation (of claims) filed (gb section 80(3)/1977) |
| GBDL+ | GB: delete "european patent ceased" from journal |
| GBRH+ | GB: ep (uk) patent reinstated (gb rule 100) |
| GBRI+ | GB: ep (uk) patent reinstated (gb rule 110(3)a/1987) |
| GBT+ | GB: translation of ep patent filed (gb section 77(6)(a)/1977) |
| GBT8+ | GB: translation filed (gb section 80(3)/1977) |
| GBTA+ | GB: translation of amended ep patent filed (gb section 77(6)(b)/1977) |
| R27O+ | Opposition rejected (correction) |
| R28+ | Re-established (correction) |
| R28E+ | Date of receipt of request for re-establishment of rights (art 122) (corr.) |
| R29W+ | Resumption after interruption of proceedings (correction)[after grant] |
| RA1+ | Date and kind of first publication (correction) |
| RA4+ | Date and kind of supplementary search report (correction) |
| RB1+ | Date and kind of second publication (correction) |
| RB2+ | Date and kind of third publication (correction) |
| RBV+ | Designated contracting states (correction): |
| RJL1+ | Rejection of limitation - substantive refusal |
| RJL2+ | Rejection of limitation - inadmissible for formal reasons |
| RJL3+ | Rejection of limitation - no or late reply to subset report |
| RJL4+ | Rejection of limitation - request allowed but requirements not fulfilled |
| SC4A+ | PT: translation is available |
| T1+ | DK: translation of the claims of ep patent |

| List Part 3 | |
|---|---|
| T3+ | DK: translation of ep patent |
| T4+ | DK: translation of amended ep patent |
| T5+ | DK: corrected translation of ep patent |
| TCAT+ | AT: translation of patent claims filed |
| TCNL+ | NL: translation of patent claims filed |
| TDAT+ | AT: translation of application published |

| List Part 4 | |
|---|---|
| 110E | Request for conversion into a national patent application |
| 111L | Licenses |
| 111R | Other rights "in rem" |
| 111Z | Registering of licences or other rights |
| 16A | New documents discovered after completion of the EP-search report |
| 27A | Maintained as amended |
| 33 | Transfer of rights |
| 34E | Establishment of other rights "in rem" |
| 34G | Grant of licenses |
| 34L | Legal means of execution |
| 34TL | Transfer of licenses |
| 34TR | Transfer of other rights "in rem" |
| 35 | Correction |
| 710B | GB: proceeding under rule 110(4) patents act 1977 |
| AC | Divisional application (art. 76) of: |
| AF | Successive application (art. 61) |
| AKNL | NL: corrections (part 1 heading g) |
| BECA | BE: change of holder's address |
| BECH | BE: change of holder |
| BECN | BE: change of holder's name |
| CCPA | BE: application for a complementary protection certificate |
| CND3 | Copied from national register on demand of third party |
| DAX | Extension of the european patent to (deleted) |
| DB1 | Date and kind of second publication (deleted) |
| DB2 | Date of publication of new second specification ** last entry deleted |
| DET | DE: translation of patent claims |
| DIN1 | Inventor (deleted) |
| DIN2 | Inventor (deleted) |
| DX | Miscellaneous: (deleted) |
| FIT | IT: spc for herbicidal products: no action taken |
| FITA | IT: spc for herbicidal products: examined |
| FITC | IT: spc for herbicidal products: partially granted |
| FITE | IT: spc for herbicidal products: interlocutory refusal |
| FITF | IT: spc for herbicidal products: office refusal |
| FITH | IT: spc for herbicidal products: board of appeal |
| FITI | IT: spc for herbicidal products: court of cassation |
| FITL | IT: spc for herbicidal products: court of justice |
| GBRJ | GB: reinstated under rule 110(4) - alteration of time limits |
| GBTH | GB: translations filed: amended european patents - correction |
| INTC | Former communication of intention to grant cancelled |
| ITCP | IT: complementary protection certificate |
| ITPR | IT: changes in ownership of a european patent |
| ITTA | IT: last paid annual fee |
| K1C0 | Previously announced correction of patent application cancelled |

| List Part 5 | |
|---|---|
| CRD3 | Copy of epo register on demand of third party |
| D11X | Legal means of execution (deleted) |
| D17D | Search report (deleted) |
| D17P | Request for examination filed (deleted) |
| D17Q | First examination report (deleted) |
| D18D | EP-application deemed to be withdrawn: (deleted) |
| D18R | Refused (deleted) |
| D18W | Withdrawal (deleted) |
| D18Z | Request for re-establishment (deleted) |
| D20 | Corrections of a patent specification (deleted) |
| D26 | Opposition filed (deleted) |
| D26N | No opposition filed (deleted) |
| D27A | Maintained as amended (deleted) |
| D27C | Opposition finished (deleted) |
| D27O | Opposition rejected (deleted) |
| D27W | Revoked (deleted) |
| D8RA | Date of receipt of request for re-establishment of rights (art 122) (deleted) |
| DA1 | Date and kind of first publication (deleted) |
| DA4 | Date and kind of supplementary search report (deleted) |
| DAC | Divisional application (art. 76) of: (deleted) |
| DAF | Successive application (art. 61) (deleted) |
| DAHF | Divisional application (art 76) in: (deleted) |

| List Part 6 | |
|---|---|
| DAF | Successive application (art. 61) (deleted) |
| DAHF | Divisional application (art 76) in: (deleted) |
| DAX | Extension of the european patent to (deleted) |
| DB1 | Date and kind of second publication (deleted) |
| DB2 | Date of publication of new second specification ** last entry deleted |
| DET | DE: translation of patent claims |
| DIN1 | Inventor (deleted) |
| DIN2 | Inventor (deleted) |
| DX | Miscellaneous: (deleted) |
| FIT | IT: spc for herbicidal products: no action taken |
| FITA | IT: spc for herbicidal products: examined |
| FITC | IT: spc for herbicidal products: partially granted |
| FITE | IT: spc for herbicidal products: interlocutory refusal |
| FITF | IT: spc for herbicidal products: office refusal |
| FITH | IT: spc for herbicidal products: board of appeal |
| FITI | IT: spc for herbicidal products: court of cassation |
| FITL | IT: spc for herbicidal products: court of justice |
| GBRJ | GB: reinstated under rule 110(4) - alteration of time limits |
| GBTH | GB: translations filed: amended european patents - correction |
| INTC | Former communication of intention to grant cancelled |
| ITCP | IT: complementary protection certificate |
| ITPR | IT: changes in ownership of a european patent |
| ITTA | IT: last paid annual fee |
| K1C0 | Previously announced correction of patent application cancelled |
| K1C1 | Correction of patent application (title page) published |
| K1C2 | Correction of patent application (partial reprint) published |
| K1C3 | Correction of patent application (complete reprint) published |
| K2 | Correction of patent specification published |
| K2C0 | Announced rectification cancelled |
| K2C1 | Correction of patent specification (title page) published |
| K2C2 | Correction of patent specification (partial reprint) published |
| K2C3 | Correction of patent specification (complete reprint) published |
| KL | Correction list |
| LIM1 | Limitation is admissible |
| LIM2 | Limitation is inadmissible |
| LIM3 | Limitation deemed not to be filed |
| LIM4 | Limitation deemed not to be filed, opposition pending or filed |
| LIM5 | Limitation withdrawn |
| MED | IT: spc for pharmaceutical products: no action taken |
| MEDA | IT: spc for pharmaceutical products: examined |
| MEDC | IT: spc for pharmaceutical products: partially granted |
| MEDE | IT: spc for pharmaceutical products: interlocutory refusal |
| MEDF | IT: spc for pharmaceutical products: office refusal |
| MEDH | IT: spc for pharmaceutical products: board of appeal |
| MEDI | IT: spc for pharmaceutical products: court of cassation |
| MEDL | IT: spc for pharmaceutical products: court of justice |
| NLR2 | NL: decision of opposition |
| NLR5 | NL: patents in respect of which a request to provide a certificate of prior use has been filed |
| NLR6 | NL: patents in respect of which a decision has been taken on a request concerning prior use |

List Part 6

| | |
|---|---|
| NLS | NL: assignments of EP-patents |
| NLT1 | NL: modifications of names registered in virtue of documents presented to the patent office pursuant to art. 16 a, paragraph 1 |
| NLT2 | NL: modifications (of names), taken from the european patent bulletin |
| NLUE | NL: license registered with regard to european patents |
| NLXE | NL: other communications concerning EP-patents (part 3 heading xe) |
| PRVG | Petition for review by the enlarged board of appeal granted |
| PRVN | Petition for review by the enlarged board of appeal not granted |
| R110 | Filing of a request for conversion (correction) |
| R11L | Granting of a license (correction) |
| R11X | Legal means of execution (correction) |
| R16A | New documents discovered after completion of the EP-search report (correction) |
| R17D | Search report (correction) |
| R18Z | Request for re-establishment (correction) |
| R19A | Stay of proceedings (correction)[before grant] |
| R20 | Corrections of a patent specification |
| R26N | No opposition filed (correction) |
| R27C | Opposition finished |
| R80 | Public notification if the address of the addressee cannot be established |
| RAC | Divisional application (art. 76) of: (correction) |
| RAF | Successive application (art. 61) (correction) |
| RAG | Has successive application (art. 61) (correction) |
| RAP1 | Transfer of rights of an ep application |
| RAP2 | Transfer of rights of an ep publication |
| RAP3 | Correction of the address or name of applicant (a document) |
| RAP4 | Correction of name or address of patent owner (b document) |
| RAX | Extension of the european patent to (correction) |
| REF | Corresponds to: |
| REG | Reference to a national code |
| RHK1 | Main classification (correction) |
| RHK2 | Main classification (correction) |
| RIC1 | Classification (correction) |
| RIC2 | Classification (correction) |
| RIN1 | Inventor (correction) |
| RIN2 | Inventor (correction) |
| RTI1 | Title (correction) |
| RTI2 | Title (correction) |
| T2 | DK: corrected translation of the claims of ep patent |
| XX | Miscellaneous: |
| ZE | NL: corrections to earlier entries in headings pe - xe |

After the data is selected and the feature scaling factors are computed, the training of the model starts by randomly or pseudo-randomly choosing features as the input to classification model trainer. Using a genetic algorithm search heuristic, a population of sets of features is created and in each set the features included are randomly or pseudo-randomly selected.

Each population is then used to train a binary classifier in the next step. The output of the classification-training step is a value that indicates how well that collection of features performs on the training set of patent data.

The Artificial Neural Network (ANN) model will now be described to illustrate an aspect of the system's search heuristic to find an optimal classifier.

Figure 5:
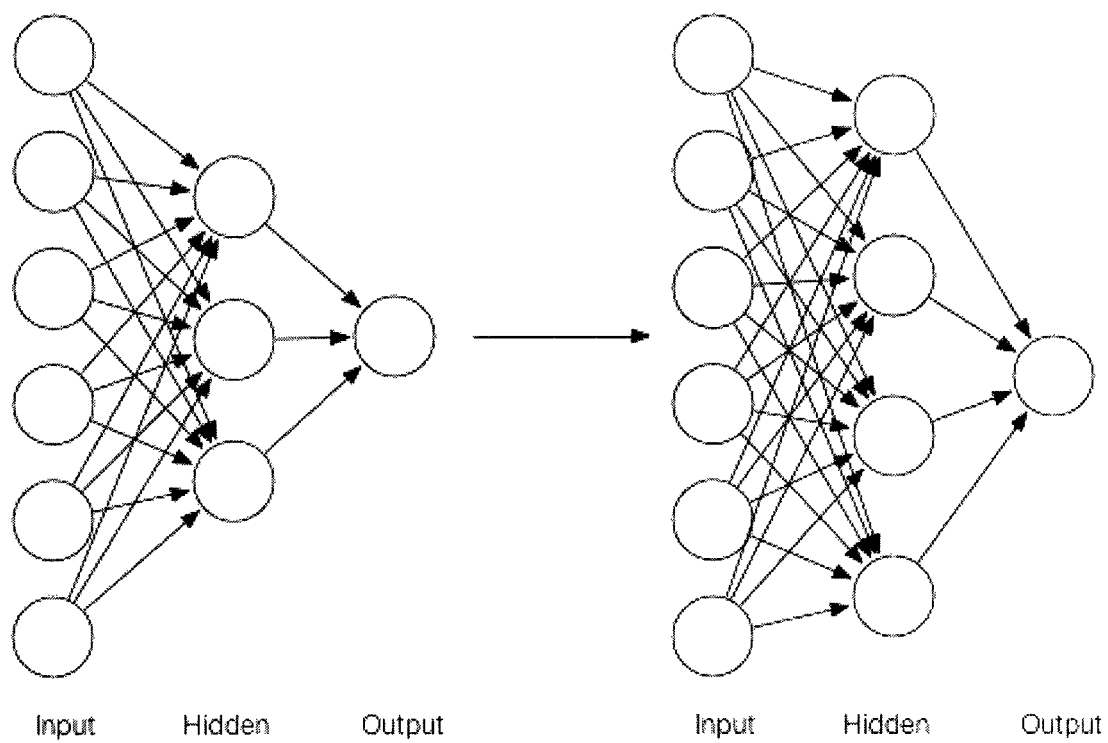
FIG. 5 is an example of an artificial neural network model iteration for finding binary classifiers, according to an aspect of the present disclosure.

The size of the input layer to the ANN is defined as the number of selected features provided by the feature selector. In an Artificial Neural Network, the calculations "flow" from the input nodes on the left, through the nodes of the hidden layers and finally to the output node, as illustrated in FIG. 5. The size of the output layer is set at 1. During this step, the system varies iteratively the number of hidden layers and the number of nodes at each layer. Each node represents a mathematical combination of its inputs, and so the weights attached to the lines that represent the connections between nodes adjust how much affect one node has on another node. Given this, the hidden layers serve to increase the complexity that the classifier is able to model. In an ANN with no hidden layers, the maximum complexity is a linear system. Each additional layer means that arbitrarily complex domains can be represented and potentially give more accurate classifications.

The system initially considers an ANN with a single hidden layer with size equal to the half the size of the input features. The ANN is then trained using a feedforward cost function and backpropagation algorithms to compute the gradient of errors. Feedforward refers to the process of values propagating from the input along the edges to the hidden nodes and then the computed values from the hidden nodes propagating to the output node. Backpropagation refers to the process of computing the difference between the final output of the classifier against the test set and then computing the error that each of the hidden nodes contributed to that output. Backpropagation then computes the amount of error that each of the input nodes contributed to the final calculation. The result of backpropagation is the gradient of errors, which is a measure of the amount of error at each node along each path through the network. During training, the gradient of errors is used to alter the weights in the neural network to reach the optimal classifier. The errors are computed by evaluating the current ANN on the cross-validation set. This avoids the problem of the classifier being too specific (i.e., overfit) to the training set.

Once an optimal solution, as defined by a minimization of the difference in the output of the ANN and the testing set, is found, the Area Under the Curve (AUC) of the ROC curve is calculated by iterating over possible thresholds from 0 to 1 that the ANN uses to determine the output of the classifier. For example, if the threshold is 0.4, then any input to the output layer that is greater than 0.4 will be considered a prediction that the patent would be maintained. For each threshold, the system computes the true and false positive and the true and false negative rates. These data points are used to plot the ROC curve and compute the AUC.

After training the first classifier using the previously described method, the system alters the number of nodes in the hidden layer. The system then repeats the training and AUC computation for the new ANN. If the prediction is better, meaning that a larger area under the ROC curve is yielded, the new parameters are saved and the number of nodes in the input layer is again altered. This proceeds until the maximal AUC is found.

The system then increases the number of hidden layers to two and sets the size of the nodes in each layer to be half the inputs of that hidden layer's inputs. In the current example, this means the first hidden layer has 10 nodes and the second hidden layer has 5.

The system trains the ANN using the previously described method. The number of nodes in the hidden layers is then altered and the new ANN is trained. This proceeds until the maximal AUC is found. The classifier-training step returns the parameters of the binary classifier that had the maximal AUC.

The last step in the process is that the feature selection search heuristic changes the set of features using a genetic algorithm. The genetic algorithm selects the best sets of features to use in the next iteration of the search by choosing those features that performed best as measured by the maximum AUC that set. The best sets of features are combined and mutated (slight, random or pseudo-random changes) to create a new population of candidate solutions.

The classification-training step is then executed again, and the feature selection search heuristic collects all of the AUC outputs, then selects the best feature sets and creates a new population. This process continues until the selection process no longer finds better solutions. The best solution from all iterations of the feature selection search is the model that will be used in calculation of the patent scores.

The output of a binary classifier during training may be executed through a step function so that the actual prediction is a binary decision. The raw patent score output from this system is this value not executed through the step function; this raw comparative score forms the basis for the computation of additional scores.

Figure 6:
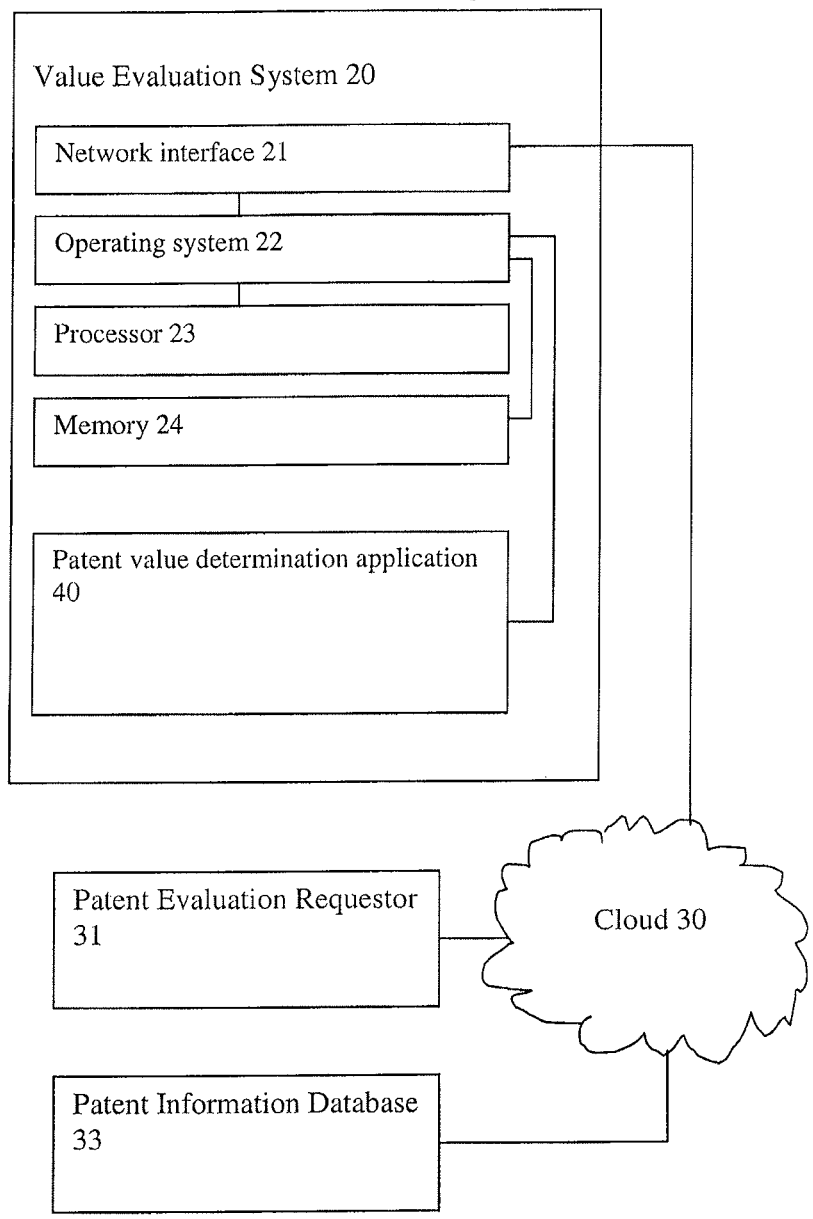
FIG. 6 is a schematic diagram showing an overview of a value evaluation system connected over a network, according to an aspect of the present disclosure.
Figure 7:
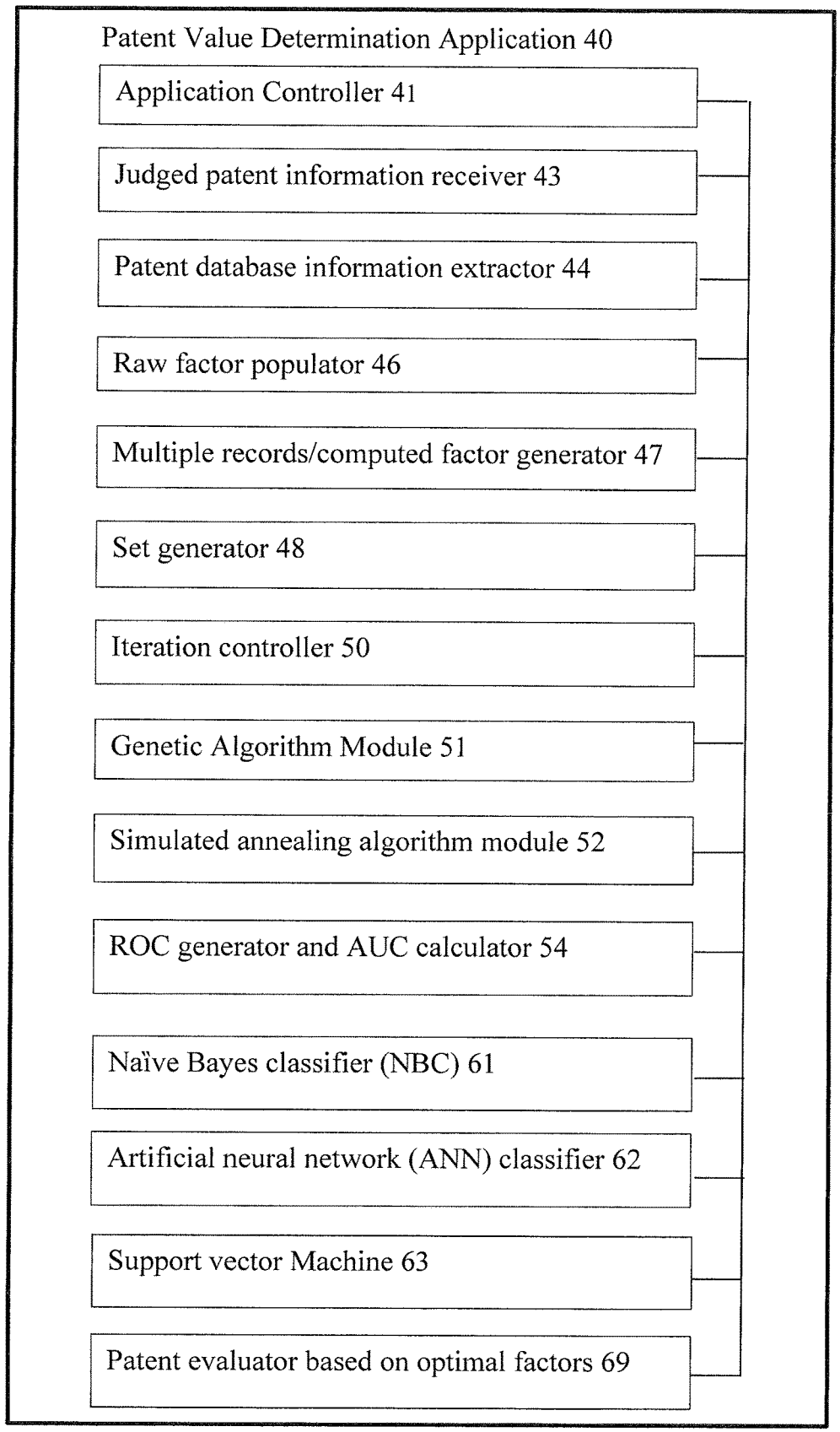
FIG. 7 is an example of a patent value determination module and some components, according to an aspect of the present disclosure.

By way of an example of an implementation, FIG. 6 illustrates Patent value determination application 40 residing or running on Value Evaluation System 20, which may be a server connected to the internet for providing information about the value of a patent to Patent Evaluation Requestor 31, a terminal connected to the Internet. Such a server may include network interface 21 for communicating with a network, operating system 22 for running the device, and a processor 23 and memory 24.

Patent value determination application 40 may obtain information from a database 33 or more than one such database. One or more software applications providing the functionality herein described may be provided by a server or server bank in the cloud or on a proprietor's premises, or may be downloaded to a computer or portable device of the user to make possible the delivery of patent or patent application value to a requesting user. Patent value determination application 40 illustrated in FIG. 6 may include a number of components or software modules under control of application controller 41. For example, judged patent information receiver 43 may receive identifying and other detailed information about a patent of interest or a target patent document to be evaluated. Patent information extractor 44 can obtain relevant information from database 33 to be used for generating the sets by set generator 48 and to produce the factor inputs for the algorithm by modules 46 and 47. Iteration controller 50 of patent value determination application 40 can control the iterations of the Genetic algorithm and/or the simulated annealing algorithm performed by modules 51 and 52, respectively, and ROC generator and AUC calculator 52 can obtain the best-fitting results using NBC, ANN and/or a support vector machine implemented by modules 61, 62 and 63, respectively. Patent evaluator 69 provides a result to the requestor based on the optimal factors obtained.

The present methods, functions, systems, computer-readable medium product, or the like may be implemented using hardware, software, firmware or a combination of the foregoing, and may be implemented by one or more automated processors or computer chips or cores, in one or more computer or other processing system, such that no human operation may be necessary.

Figure 8A:
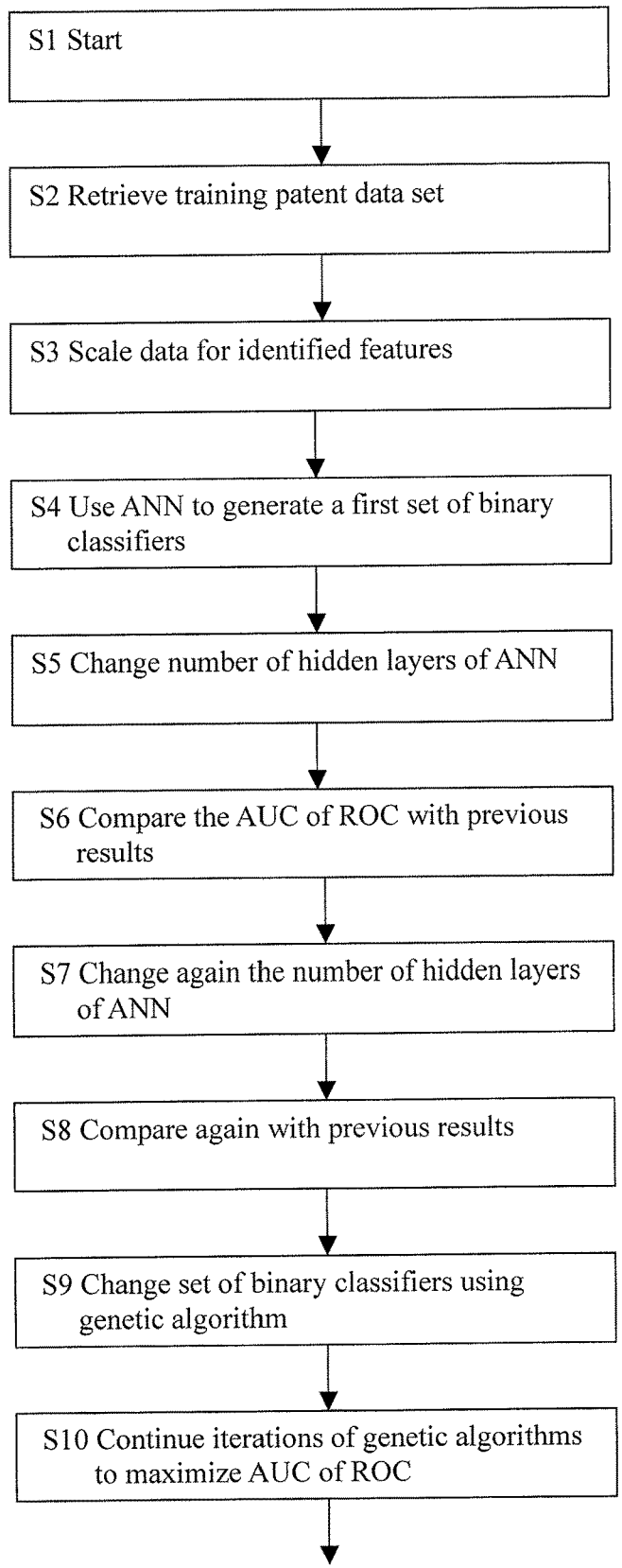
FIGS. 8A-8B contain a flowchart illustrating an example of steps of a machine learning and patent life query responding method, according to an aspect of the present disclosure.
Figure 8B:
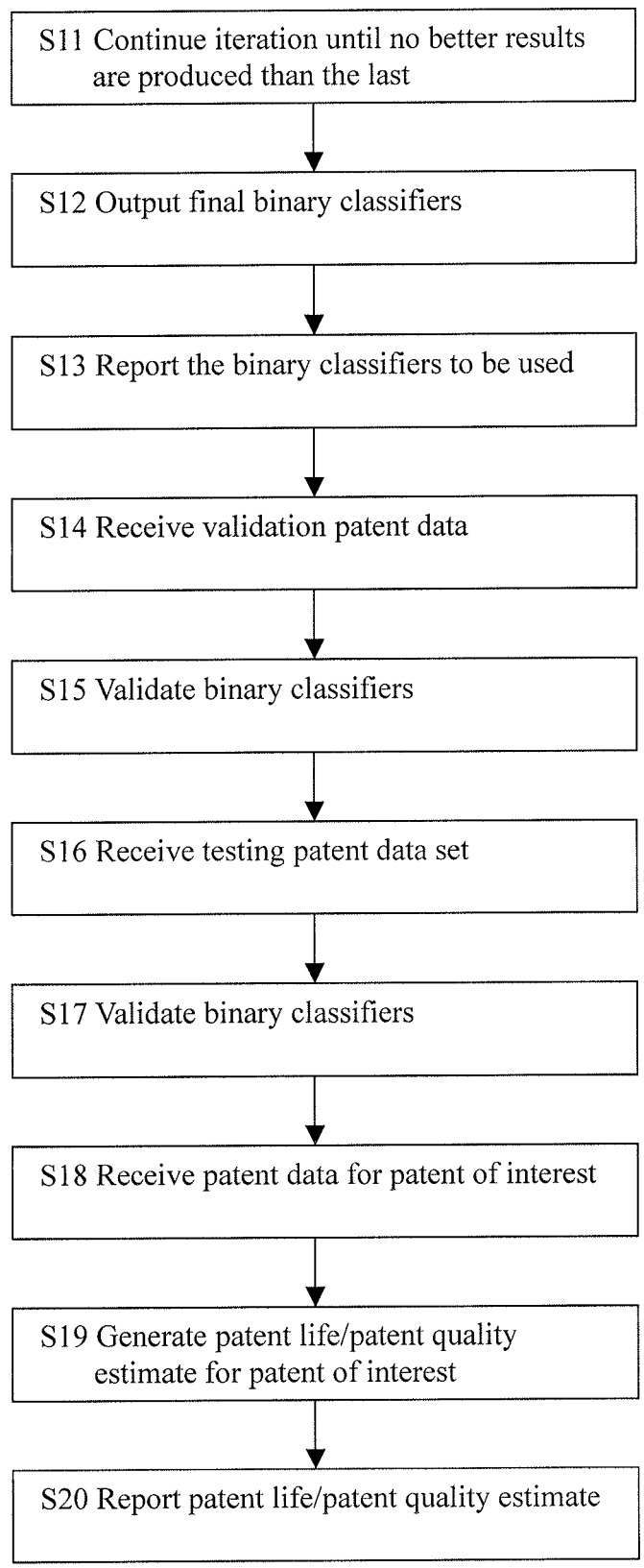

FIGS. 8A-B contain a flowchart showing steps of an example of a machine learning, according to an aspect of the present disclosure.

After system start, the system at S2 retrieves a set of training patent data, for example, over a network, such as the Internet. As illustrated in FIG. 6, a patent information database 33, such as the European Patent Office, WIPO, U.S. Patent Office Database, a private database with patent information or a combination of the foregoing may be accessed online. A proprietary database located on site or off site may be used in addition to or instead of the foregoing. At S3, a list of features of potential interest is made and a weighted scale or standardized score is assigned to each feature. At S4, a heuristic search method, such as ANN, is used to generate a first set of binary classifiers. Iteratively, the ANN model is modified, at S5, by changing a number of hidden layers. This second set of binary classifiers is then compared with the first set with reference to a cost function, such as an area under a curve (AUC) of a ROC at S6. At S7, the ANN model may be further iterated through by changing the number of hidden layers and, at S8, the result is compared with the highest yielding binary classifier set thus far. At S9, a genetic algorithm may be used to improve upon the candidate set of binary classifiers. At S10, iterations of the genetic algorithm are continued to maximize the area under the curve of the ROC.

FIG. 8B contains S11. At S11 the iteration of the genetic algorithm is continued until no improved set of candidates binary classifiers is produced. At S12, the final set of binary classifiers is reported or outputted. This set of binary classifiers to be used or validated and tested may be reported (S13).

At S14, a validation patent data set may be received. However, it will be understood that the training patent data, the validation patent data and the testing patent data may all be received at the same time and randomly or pseudo randomly assigned to one of the three groups. At S15, the validation patent data is used to validate the final set of binary classifiers. At S16, testing patent data are received, and at S17 the testing patent data set is used to validate the final set of binary classifiers.

At S18, a patent of interest is received by the system, and at S19, an estimate of patent life or other patent quality estimate is generated using the binary classifiers arrived at through the machine learning algorithm. At S20, a report of the patent quality estimate, such as the patent life for the patent of interest is reported.

Thus described is a machine learning solution that may be more efficient, more speedy and may improve the functioning of a computer including an automated data processor or a set of automated data processors carrying out the machine learning when compared with, for example, a device implementing brute-force solutions. Utilizing a machine-learning approach as described herein according to the present disclosure, the solution space to be searched may be reduced in every iteration because combinations of factors and coefficients that do not lead to an optimal solution can be excluded. Theoretically, while reducing the number of solutions evaluated may exclude the optimal solution, the randomness introduced by the mutation step may be sufficient to reduce this risk. Further, a machine-learning approach as described herein according to the present disclosure may significantly reduce the system resources needed to calculate the solution by more intelligently and efficiently selecting factors and coefficients for evaluation.

For the reasons discussed above, such machine learning approaches may be more expensive to implement, more time and resource intensive, and may consume significantly more computer processing resources. A machine learning solution as described according to the present disclosure may consume less energy and generate less heat when carried out on an automated data processor or set of automated data processors.

A computer system for implementing the foregoing methods, functions, systems and computer-readable storage medium may include a memory, preferably a random access memory, and may include a secondary memory. Examples of a memory or a computer-readable storage medium product include a removable memory chip, such as an erasable programmable read-only memory (EPROM), a programmable read-only memory (PROM), removable storage unit or the like. The methods and functions can be performed entirely automatically through machine operations, but need not be entirely performed by machines. Similarly, the systems and computer-readable media may be implemented entirely automatically through machine operations but need not be so. A computer system may include one or more processors in one or more units for performing the system according to the present disclosure and these computers or processors may be located in a cloud or may be provided in a local enterprise setting or off premises at a third party contractor, and may communicate with a user requesting an evaluation or estimation of patent or patent application quality on site via a wired or wireless connection, such a through a LAN or WAN, or off site via internet protocol-enabled communication, via a cellular telephone provider or via other such means. Similarly, the information stored and/or the patent database from which the sets of data are extracted, may be stored in a cloud, in an official or third party patent information database, or may be stored locally or remotely. The computer system or systems that enable the user to interact with content or features can include a GUI (Graphical User Interface), or may include graphics, text and other types of information, and may interface with the user via desktop, laptop computer or via other types of processors, including handheld devices, telephones, mobile telephones, smartphones or other types of electronic communication devices and systems.

The communication interface of the Value Evaluation System shown in FIG. 6 may include a wired or wireless interface communicating over TCP/IP paradigm using HTTP or other types of protocols, and may communicate via a wire, cable, fire optics, a telephone line, a cellular link, a satellite link, a radio frequency link, such as WI-FI or Bluetooth, a LAN, a WAN, VPN, the world wide web or other such communication channels and networks, or via a combination of the foregoing.

While the preferred embodiments of the invention have been illustrated and described, modifications and adaptations, and other combinations or arrangements of the structures and steps described come within the spirit and scope of the application and the claim scope.

What is claimed is:

1. A machine-learning based artificial intelligence device used is estimating patent quality, the device comprising:
   a patent data retriever configured to receive a first set of patent data, the first set of patent data comprising at least one of patent application data and patent data for a plurality of patent applications and patents, wherein the first set of patent data includes, for each patent application and patent of the plurality of patent applications and patents:
      references cited information associated with references cited in a respective patent application or patent;
      cited by information associated with references that cite the respective patent application or patent; and
      classification information associated with one or more patent classifications corresponding to each respective patent or patent application;
   a classifier configured to generate, using an automated processor applying a machine learning algorithm, a set of features based on the first set of patent data, and
   a user information manager configured to receive target patent information associated with a target patent and to provide the estimate of patent quality associated with the target patent according to the set of features.

2. The machine-learning based artificial intelligence device of claim 1, further comprising:
   a quantitative data scalar configured to normalize data included in the first set of patent data, wherein the normalized data is used by the classifier to generate the set of features.

3. The machine-learning based artificial intelligence device of claim 2, wherein the quantitative data assigns weights to data items included in the first set of patent data and the weights data items are used by the classifier to generate the set of features.

4. The machine-learning based artificial intelligence device of claim 1, wherein the first set of patent data includes raw data extracted from the patent application data and the patent data and derived data derived based on the raw data.

5. The machine-learning based artificial intelligence device of claim 1, wherein the derived data includes group data associated with a first group of patents of the plurality of patents based on the raw data associated with each of the patents in the first group of patents.

6. The machine-learning based artificial intelligence device of claim 5, wherein the first group of patents includes all patents in the plurality of patents.

7. The machine-learning based artificial intelligence device of claim 5, wherein the first group of patents includes less than all patents in the plurality of patents.

8. A system comprising the device of claim 1 and a second device communicatively connected to the machine-learning based artificial intelligence device over a network, the second device comprising:
   a second automated processor:
   a user interface receiving the target patent information for the target patent;
   an estimate requester requesting from the machine-learning based artificial intelligence device, the estimate of patent quality for the target patent; and
   a user interface providing, to a user, information indicating the estimate of patent quality.

* * * * *